Patented Feb. 21, 1939

2,147,743

UNITED STATES PATENT OFFICE 2,147,743

PHARMACEUTICAL PREPARATION

David Levin, Philadelphia, Pa., assignor to J. T. Baker Chemical Co., Phillipsburg, N. J., a corporation of New Jersey No Drawing. Application August 5, 1938, Serial No. 223,201

2 Claims. (Cl. 167—57)

The present invention relates to pharmaceutical preparations, and more particularly to such preparations including a magnesium salt.

An object of the invention is to provide in dry form a composition of matter including a particular magnesium compound and a fruit acid, which composition is quickly and clearly soluble and effervescent in water at ordinary temperatures.

It is a specific object of the invention to provide in dry form a composition of matter for producing effervescent magnesium citrate by the simple addition of the composition to water under ordinary conditions, the composition being distinguished by its ready and clear solubility.

It is likewise an object of the invention to provide in dry form various known salts with the addition thereto (in order to make them effervescent) of a particular magnesium carbonate and a fruit acid, thus producing a dry compound which will effervesce, be readily soluble, and form, in water, a magnesium salt of therapeutic value, with or without the presence of other pharmaceuticals.

The invention resides in the combination, in a dry composition, of normal magnesium carbonate and a fruit acid, as hereinafter described and claimed.

Referring first, by way of example, to the dry composition quickly and clearly soluble with effervescence for producing magnesium citrate when the composition is added to water, it may be pointed out that prior to this invention, attempts have been made to compound commercially a dry magnesium citrate-producing composition, the object being to avoid the bulk of the liquid product in shipping and storing, to avoid the gradual deterioration to which the liquid product is subject and to avoid the costly laboratory production methods heretofore always required in order to get the product into solution.

Pharmaceutical preparation of citrate of magnesia is commonly known, and described for example in "New Standard Formulary," Hiss and Ebert, 1920, 5th edition, page 333; "U. S. Dispensatory" 1926, 21st edition, pages 643, et seq. It has been accepted practice to include in such preparations other ingredients, whose presence is desired to make an acceptable and palatable product. For example, the liquid magnesium citrate may include sugar or sugar syrup, oil of lemon, sodium or potassium bicarbonate.

The present invention is directed to the inclusion, in such compositions, of normal magnesium carbonate in place of the magnesium carbonate heretofore used.

The magnesium carbonate heretofore used has been either the magnesii carbonis levis or the magnesii carbonis ponderosis of the U. S. Dispensatory. The former or light magnesium carbonate is basic magnesium carbonate, a light, white powder only slightly soluble in water. The heavy magnesium carbonate is also a white powder, and is also very slightly soluble in water.

Both of the foregoing carbonates are distinguished by the presence therein of magnesium hydroxide, whereas the normal salt used in the preparation of compositions according to the present invention contains no magnesium hydroxide, the hydroxide radicals being replaced by acid radicals; it is a much heavier non-dusty powder having a crystalline structure; it reacts far more quickly with fruit acids, entering into clear solution, free of any substantial cloudiness, and is very readily soluble in water.

The present invention is not concerned with the making of normal magnesium carbonate. Any known method of making it may be used. For example, magnesium sulphate solution may be mixed with an equivalent amount of sodium bicarbonate solution, this mixture being allowed to stand several days in a cool place. Small crystals of normal magnesium carbonate will settle out of solution and these may be then filtered, washed and dried. It may be pointed out that the normal magnesium carbonate may be a monohydrate or may contain a larger amount of water of crystallization, but it does not contain magesium hydroxide.

As an example, the dry magnesium citrate-producing composition of the present invention may be a mixture of:

| | |
|---|---|
| Citric acid | grams__ 33 |
| Sugar | do____ 50 |
| Potassium bicarbonate | do____ 2.5 |
| Oil of lemon | c. c.____ 0.1 |
| Normal magnesium carbonate | grams__15 to 20 |

It will be understood that equivalent sodium bicarbonate may be substituted for the potassium bicarbonate, and that more or less sugar or flavoring may be used. With such variations, which are not critical, the present invention is not concerned, the invention concerning itself essentially in this embodiment with what may be termed the principal chemical ingredients for producing the magnesium citrate; namely, normal magnesium carbonate and, in this instance, citric acid. It may be pointed out that regardless of the amount of water of crystallization in the normal magnesium carbonate used, dissolving in water the dry powder made up according to the above formula quickly yields a clear, effervescent solution of the exact chemical composition of the U. S. P. magnesium citrate solution.

In compounding the foregoing composition, the powder ingredients may be mixed first, the small amount of oil of lemon may then be added (this being taken up by the powder without any caking); or the magnesium carbonate and sodium bicarbonate may first be mixed together, and then added to a mixture of the dry citric acid, sugar and oil of lemon. In either case, the composition is one which reacts quickly when put into water and dissolves rapidly into a clear, effervescent solution. As distinguished from other compositions difficultly or only slightly soluble in water, the foregoing composition forms a clear solution in water with effervescence in about one minute. It is not necessary to heat the water, and the user is spared the necessity of laboriously stirring over a relatively long period of time. Moreover the dry composition does not deteriorate with lapse of time, and has the further advantage that, since it can be put up in papers as a dry powder, the user can make up, at one time, only as much as may be needed, as distinguished from purchasing a bottle of liquid solution (mostly water) which may have deteriorated, and none of which can be saved for future use once the bottle has been opened.

In the foregoing example, it will be noted that a particular fruit acid was employed in order to produce a citrate. The invention, however, in its broader aspects is not limited to this particular fruit acid alone, as it will be apparent that a similar dry composition could be compounded with tartaric acid for the production of magnesium tartrate.

Further examples of embodiments of the invention, (normal magnesium carbonate and a fruit acid or acids) illustrating its use in compositions containing other medicinal ingredients, in the form of dry powders are the following:

*Effervescent artificial Carlsbad salt*

| | Grams |
|---|---|
| Artificial Carlsbad salt | 250 |
| Normal magnesium carbonate | 288 |
| Tartaric acid, dried and powdered | 170 |
| Citric acid, in uneffloresced crystals | 250 |

*Effervescent artificial Kissingen salt*

| | Grams |
|---|---|
| Artificial Kissingen salt | 400 |
| Normal magnesium carbonate | 244 |
| Tartaric acid, dried and powdered | 94 |
| Citric acid, in uneffloresced crystals | 250 |

*Effervescent salt of lithium citrate*

| | Grams |
|---|---|
| Lithium citrate | 50 |
| Normal magnesium carbonate | 342 |
| Tartaric acid, dried and powdered | 300 |
| Citric acid, in uneffloresced crystals | 195 |

*Effervescent salt of magnesium sulfate*

| | Grams |
|---|---|
| Magnesium sulfate, in uneffloresced crystals | 500 |
| Normal magnesium carbonate | 242 |
| Tartaric acid, dried and powdered | 211 |
| Citric acid, in uneffloresced crystals | 136 |

*Compound effervescent salt of potassium bromide*

| | Grams |
|---|---|
| Caffeine, in fine powder | 8 |
| Potassium bromide, in fine powder | 83 |
| Lithium carbonate | 42 |
| Normal magnesium carbonate | 352 |
| Tartaric acid, dried and powdered | 180 |
| Citric acid, in uneffloresced crystals | 250 |

*Effervescent artificial Vichy salt*

| | Grams |
|---|---|
| Artificial Vichy salt | 250 |
| Normal magnesium carbonate | 292 |
| Tartaric acid, dried and powdered | 164 |
| Citric acid, in uneffloresced crystals | 250 |

It will be apparent from the foregoing examples that in these formulas, according to the present invention, normal magnesium carbonate has been used, whereas in prior practice, some other substance such as sodium bicarbonate, has been used, but in a greater quantity. The amount of normal magnesium carbonate needed, however, is of the order of 60 percent of the amount of sodium bicarbonate that has been heretofore used in the manufacture of such effervescent salts.

By way of further illustration, the present invention is applicable to the manufacture of bromide tablets such, for example, as the so-called triple bromides, where it has been customary to include in the tablets, in addition to the bromides, certain salts and acids to make the tablets effervescent, such as sodium bicarbonate and citric acid. According to the present invention, such tablets are made up to include, in addition to the bromides, normal magnesium carbonate and a fruit acid. In such a compound, $\frac{6}{10}$ gram of normal magnesium carbonate may be used for each gram of sodium bicarbonate which it replaces.

In general the invention resides in combining, in a dry mixture, normal magnesium carbonate and a fruit acid in the manufacture of effervescent salt-producing mixtures. Not only is a less quantity of normal magnesium carbonate required than the amount of sodium bicarbonate to produce an equivalent effervescent effect, but also the composition has the added advantage of forming a desirable magnesium compound, which results from the combination of the normal magnesium carbonate with the fruit acid when the dry mixture is placed in water.

The invention is applicable to the manufacture of such dry mixtures where the principal result desired is the production of the magnesium compound itself, as in the first example herein given, even though other substances such as sugar, flavoring, etc. may be present in greater or less quantity. The invention is also applicable to the manufacture of dry, effervescent salt-producing mixtures including other substances present for particular therapeutic effects, as shown by other of the examples.

It will be understood that, according to the invention, tartaric acid may be used in place of citric acid for the production of a tartrate with effervescence, and that other fruit acids such as malic acid or maleic acid and others may be used with equally beneficial results. The term "fruit acid" is used herein as a general term to include acids either synthetic or natural such as those extracted from the various fruits, such as grapes, apples, sumac, raspberries, strawberries, peaches, pears, etc.

This application is a continuation-in-part of my prior application Serial No. 137,314, filed April 16, 1937.

What is claimed is:

1. A dry effervescent salt-producing composition including the ingredients, normal magnesium carbonate and a fruit acid.

2. A solid and quickly and clearly soluble, effervescent magnesium citrate-producing composition including, as its principal ingredients, citric acid and normal magnesium carbonate.

DAVID LEVIN.